United States Patent [19]
Kotake

[11] Patent Number: 5,323,611
[45] Date of Patent: Jun. 28, 1994

[54] SPEED CHANGE CONTROLLER OF RUNNING HYDRAULIC MOTOR

[75] Inventor: Nobukazu Kotake, Komatsu, Japan

[73] Assignee: Kabushiki Kaisha Komatsu Seisakusho, Japan

[21] Appl. No.: 838,232

[22] PCT Filed: Aug. 30, 1989

[86] PCT No.: PCT/JP89/00887

§ 371 Date: Mar. 23, 1992

§ 102(e) Date: Mar. 23, 1992

[87] PCT Pub. No.: WO91/03651

PCT Pub. Date: Mar. 21, 1991

[51] Int. Cl.$^5$ ............................................. F46D 31/02
[52] U.S. Cl. ........................................ 60/449; 60/451
[58] Field of Search ................ 60/443, 449, 451, 465, 60/493, 368

[56] References Cited

U.S. PATENT DOCUMENTS

| | | | |
|---|---|---|---|
| 3,177,964 | 4/1965 | Anderson | 60/451 |
| 3,230,699 | 1/1966 | Hann et al. | 60/449 |
| 3,302,389 | 2/1967 | Cadiou | 60/451 |

FOREIGN PATENT DOCUMENTS

| | | |
|---|---|---|
| 57-200756 | 12/1982 | Japan . |
| 60-215104 | 10/1985 | Japan . |
| 61-135834 | 6/1986 | Japan . |
| 63-190904 | 4/1988 | Japan . |
| 63-54521 | 8/1988 | Japan . |
| 63-275803 | 11/1988 | Japan . |
| 1186439 | 7/1989 | Japan . |

Primary Examiner—Edward K. Look
Assistant Examiner—F. Daniel Lopez
Attorney, Agent, or Firm—Welsh & Katz, Ltd.

[57] ABSTRACT

The present invention relates to an apparatus for controlling the running speed of a hydraulic motor. A hydraulic motor employable for a construction machine such as a power shovel or the like as a driving power source is constructed such that its rotational speed can be changed to assume either a high speed (low torque) or a low speed (high torque) so as to cope with differences in the running state of the construction machine. The apparatus of the subject invention assures that the running state of the construction machine is determined by not only the running load of a hydraulic motor but also its rotational speed, whereby the construction machine can run smoothly at all times.

3 Claims, 3 Drawing Sheets

SPEED CHANGE CONTROLLER OF RUNNING HYDRAULIC MOTOR

TECHNICAL FIELD

The present invention relates to an apparatus for variably controlling a running speed of each hydraulic motor wherein a swash plate angle of each hydraulic motor is properly controlled so as to allow a rotational speed of each variable displacement type hydraulic motor to be changed by way of two steps to assume either of a high speed and a low speed.

BACKGROUND ART

Variable displacement type hydraulic motors have been hitherto practically used as a driving power source for running a construction machine such as a power shovel or the like. Each hydraulic motor of the foregoing kind is constructed such that its rotational speed can variably be changed by way of two steps to assume either of a high speed (low torque) and a low speed (high torque) so as to properly cope with variation of the running state of the construction machine. In some case, a speed changing operation to be performed by way of two steps is manually accomplished. For example, when the construction machine runs on a flat road surface, a swash plate angle of each hydraulic motor is shifted to the position corresponding to a high speed (low torque) by operator's actuation. In addition, in a case where the construction machine is required to run at a low speed or when a high torque is required so as to allow the construction machine to run on the road surface having a certain gradient, the swash plate angle is shifted to the position corresponding to a low speed (high torque) by operator's actuation so as to allow the construction machine to run while changing its running speed by way of two steps. According to the prior inventions disclosed in official gazettes of Japanese Utility Model Application NO. 61-148732 and Japanese Patent Application NO. 62-19768, a swash plate variable cylinder corresponding to a high speed and a swash plate variable cylinder corresponding to a low speed are arranged separately for a high rotational speed and a low rotational speed of each hydraulic motor so as to vary a swash plate angle of each hydraulic motor, and moreover, a solenoid valve is arranged for selectively supplying a pressurized oil to either of the swash plate variable cylinder for a high speed and the swash plate variable cylinder for a low speed so as to properly perform an automatic speed changing operation in conformity with the present running state of a vehicle by detecting the present pressure of the pressurized oil discharged from a hydraulic pump rotationally driven by an engine and then properly controlling the solenoid valves based on the result derived from the pressure detection.

With respect to the conventional automatic speed changing technology as mentioned above, it has been found that there arise the following malfunctions while a vehicle runs in a transitional state.

Specifically, while a swash plate angle of each hydraulic motor is set to the position corresponding to a low speed before a vehicle such as a construction machine or the like starts to run, there does not appear any particular problem. On the contrary, in a case where a swash plate angle of each hydraulic motor is set to the position corresponding to a high speed, there arises a malfunction that a speed changing operation can not be correctly controlled.

For example, in a case where a vehicle runs at a very slow speed while an engine is driven at a low rotational speed or in a case where the vehicle starts to run with a small quantity of actuation of each actuation lever for running the vehicle, i.e., at a reduced flow rate of a pressurized oil for driving the vehicle, there is no need of running the vehicle at a high speed. However, in a case where the vehicle runs on the ground surface having a certain gradient or turns on the road surface while performing a controlling operation for changing the present speed to a high speed or a low speed as a load pressure exerted on each hydraulic motor is detected on the assumption that a swash plate angle is set to the position corresponding to a low speed, there arises another malfunction that the vehicle undesirably runs in a hunting state.

In addition, in a case where the vehicle runs on the ground surface having a certain gradient while a swash plate angle is set to the position corresponding to a high speed, when an actuating lever starts to be actuated, no torque is generated with each hydraulic motor having its swash plate angle set to the position corresponding to a high speed. Subsequently, as an actuation lever is actuated, a hydraulic pressure is raised up, causing the swash plate angle to be shifted to the position corresponding to a low speed. As a result, a certain torque is rapidly generated with each hydraulic motor. Thus, the vehicle is brought in such a very dangerous state that the vehicle starts to run abruptly.

The present invention has been made with the foregoing background in mind and its object resides in providing an apparatus for variably controlling a running speed of each hydraulic motor wherein the present running state of a vehicle is determined in consideration not only of a running load of each hydraulic motor but also of other factors, the rotational speed of each hydraulic motor set by an operator is corrected based on the results derived from a series of determinations, and moreover, the running speed of each hydraulic motor is variably controlled so as to obtain the corrected rotational speed, whereby the vehicle can smoothly run at all times.

DISCLOSURE OF THE INVENTION

According to the present invention, there is provided an apparatus for variably controlling a running speed of each hydraulic motor wherein a pressurized oil discharged from a hydraulic pump rotationally driven by an engine is supplied to each variable displacement type hydraulic motor via a rotation direction changing valve to be actuated by an actuating lever for running a vehicle, and moreover, a swash plate angle of each hydraulic motor is properly controlled so as to change a rotational speed of each hydraulic motor by way of two steps to assume either of a high speed and a low speed, wherein the apparatus comprises high speed/low speed setting means for variably setting the rotational speed of each hydraulic motor to a high speed or a low speed, swash plate angle variable actuators arranged separately for a high speed and a low speed to be assumed by each hydraulic motor to vary a swash plate angle of each hydraulic motor, a shift valve for selectively supplying a pressurized oil outputted from the rotation direction changing valve to one of the swash plate angle variable actuators arranged separately for a high speed and a low speed, engine rotation state determining means for determining whether the present rotational speed of the engine exceeds a preset rotational speed or not, loading state determining means for determining whether the present running load of each hydraulic motor exceeds a preset value or not, and correcting means for correcting the content of setting accomplished by the high speed/low speed setting means based on the results derived from determinations made by the engine rotation state determining means and the loading state determining means, whereby the shift valve is actuated so as to obtain the rotational speed of each hydraulic motor corrected by the correcting means.

Specifically, with the apparatus of the present invention, after the rotational speed of each hydraulic motor is variably set by the high speed/low speed setting means, the rotational speed of each hydraulic motor (high speed or low speed) set in that way is corrected in consideration not only of the result derived from the determination made by the loading state determining means for determining the present loading state of each hydraulic motor but also of the result derived from the determination made by the engine rotation state determining means for determining the present state of the engine rotational speed. When the shift valve is actuated so as to obtain the rotational speed of each hydraulic motor (high speed or low speed) after completion of the correcting operation, the pressurized oil outputted from the shift valve corresponding to the corrected rotational speed of each hydraulic motor is selectively supplied to either of the swash plate angle variable actuator corresponding to a low speed and the swash plate angle variable actuator corresponding to a high speed so as to allow the swash plate angle of each hydraulic motor to be varied to obtain the rotational speed of each hydraulic motor after completion of the correcting operation.

In addition, with the apparatus of the present invention, the rotational speed of each hydraulic motor (high speed or low speed) set in the above-described manner is corrected based on the total determinations in consideration of the result derived from the determination made by the running control state determining means for determining the present actuated state of each actuating lever in addition to the result derived from the determination made by the loading state determining means as well as the result derived from the determination made by the engine rotation state determining means.

As is apparent from the above description, according to the present invention, even through a vehicle is held in a transitional state as seen immediately after it starts to run or while it turns on the ground surface, the running state of the vehicle is correctly determined based on the total determinations derived from combination of the result derived from the determination made for the present loading state of each hydraulic motor with the result derived from the determination made for the present engine rotation state, whereby the rotational speed of each hydraulic motor set in the above-described manner can properly be corrected. Consequently, a speed changing operation can very precisely be performed in conformity with the actual running state of the vehicle with the apparatus of the present invention.

BEST MODE FOR CARRYING OUT THE INVENTION

Now, the present invention will be described in detail hereinafter with reference to the accompanying drawings which illustrate preferred embodiments of the present invention.

Figure 1:
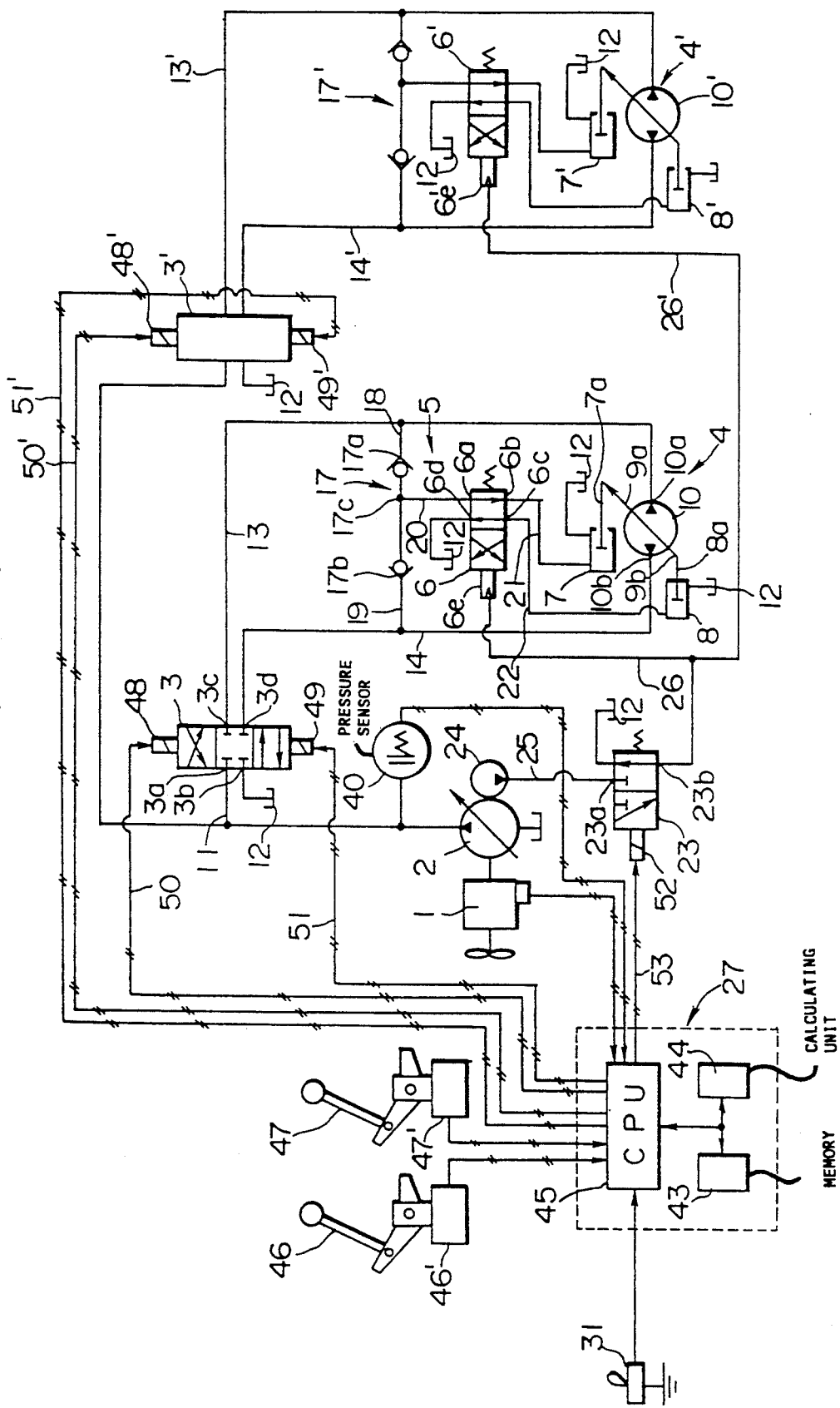
FIG. 1 is a block diagram which schematically illustrates the whole structure of an apparatus for variably controlling a running speed of each hydraulic motor in accordance with an embodiment of the present invention.

FIG. 1 schematically illustrates the whole structure of an apparatus for variably controlling a running speed of each hydraulic motor in accordance with an embodiment of the present invention.

As shown in the drawing, a variable displacement type hydraulic pump 2 and a fixed displacement type pilot pressure pump 24 are rotationally driven by an engine 1. Rotation direction changing valves 3 and 3' are valves for changing the direction of rotation of left-hand and right-hand hydraulic motors 10 and 10' each operable for running a vehicle, respectively. Each of the left-hand and right-hand hydraulic motors 10 and 10' will be described later.

A left-hand hydraulic motor assembly 4 includes a variable displacement type mechanism section 5 in addition to the left-hand hydraulic motor 10, and the variable displacement type mechanism section 5 includes as essential components a shuttle valve 17, a shift valve 6 for selectively supplying to a swash plate actuating cylinder 7 corresponding to a low speed and a swash plate actuating cylinder 8 corresponding to a high speed a pressurized oil outputted from the rotation direction changing valve 3, the swash plate actuating cylinder 7 corresponding to a low speed and the swash plate actuating cylinder 8 corresponding to a high speed. The swash plate actuating cylinder 7 corresponding to a low speed and the swash plate actuating cylinder 8 corresponding to a high speed are operatively connected to the left-hand hydraulic motor 10 via piston rods 7a and 8a and joint members 7b and 8b.

The discharge side of the hydraulic pump 2 is hydraulically connected to a pump port 3a of the rotation direction changing valve 3 via a piping 11, and a tank port 3b of the rotation direction changing valve 3 is communicated with a tank 12. In addition, connection ports 3c and 3d of the rotation direction changing valve 3 are communicated with ports 10a and 10b of the hydraulic motor 10 in the hydraulic motor assembly 4.

The shuttle valve 17 is constructed of two check valves, and an inlet port 17a of one of the check valves is communicated with the connection port 3c of the rotation direction changing valve 3 via pipings 18 and 13, while an inlet port of other check valve is communicated with the connection port 3d of the rotation direction changing valve 3 via pipings 19 and 14. A common outlet port 17c to both the check valves is communicated with a port 6a of a shift valve 6 via a piping 20, and a port 6b of the shift valve 6 is communicated with a cylinder chamber on the expansion side of the swash plate variable cylinder 7 for a low speed via a piping 21, while a port 6c of the shift valve 6 is communicated with a cylinder chamber on the expansion side of the swash plate variable cylinder 8 via a piping 22. On the other hand, a cylinder chamber on the contraction side of the swash plate variable cylinder 7, a cylinder chamber on the contraction side of the swash plate variable cylinder 8 and a port 6d of the shift valve 6 are communicated with the drain tank 12.

A hydraulic pressure sensor 40 is disposed on the piping 11 extending from the discharge side of the hydraulic pump 2 so as to detect the present hydraulic pressure of the pressurized oil discharged from the hydraulic pump 2.

A right-hand hydraulic motor assembly 4' is same to the left-hand hydraulic motor assembly 4 in structure and function and same components as those of the left-hand motor assembly 4 are represented by same reference numerals each accompanied by a dash mark. Thus, repeated description will not be required.

A speed shift solenoid valve 23 is adapted to actuate the shift valve 6 in response to an electrical command signal outputted from a central processing unit (hereinafter referred to simply as a CPU) 45 to be described later. A pump port 23a of the speed shift solenoid valve 23 is hydraulically connected to the discharge side of the pilot pressure pump 24 via a piping 25. A port 23b of the speed shift solenoid valve 23 is hydraulically connected to a pilot port 6e of the shift valves 6 in the left-hand hydraulic motor assembly 4 via a piping 26, while it is hydraulically connected to a pilot port 6e' of the shift valve 6' in the right-hand hydraulic motor assembly 4' via a piping 26'.

Figure 2:
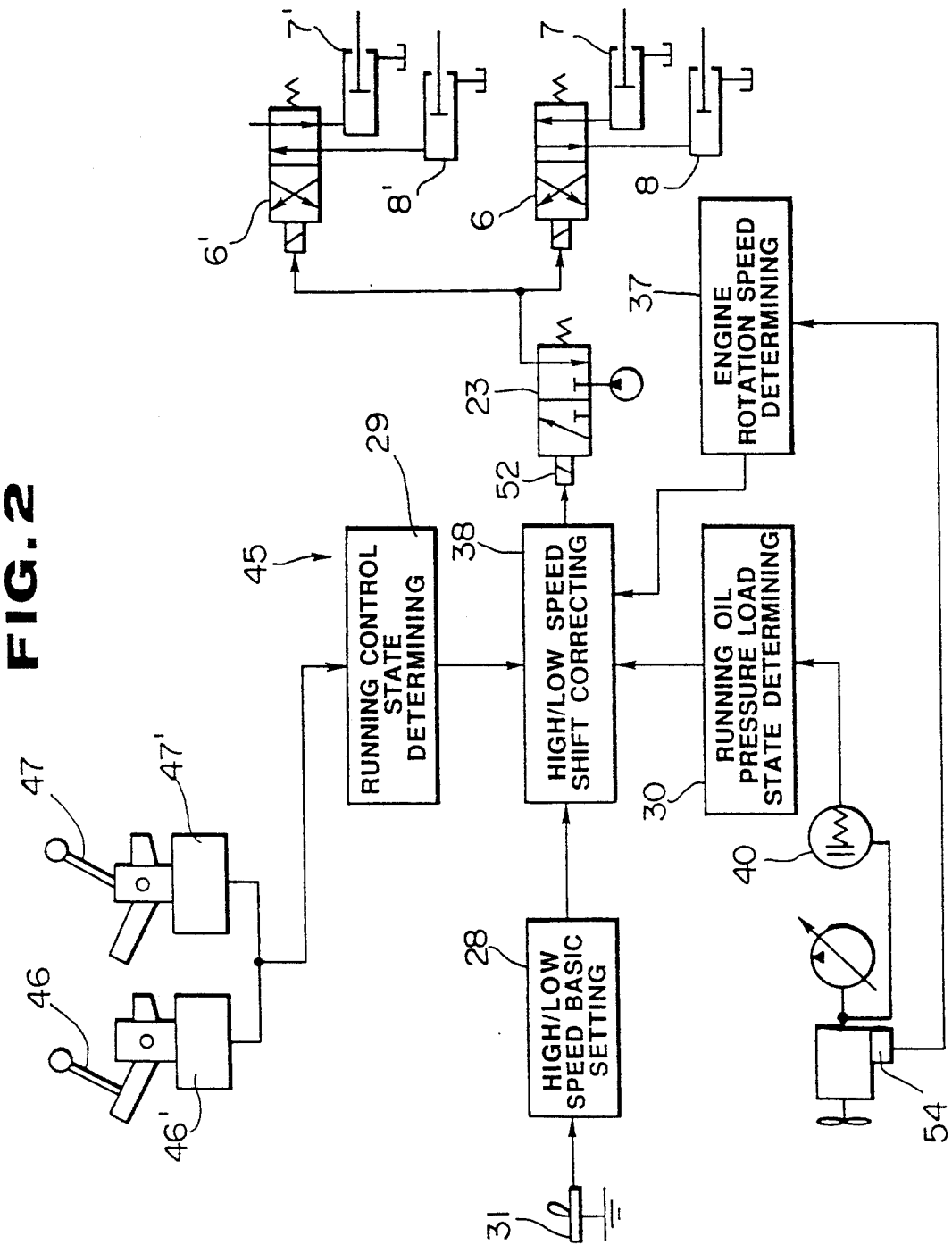
FIG. 2 is a block diagram which schematically illustrates the structure of a controller for the apparatus shown in FIG. 1, and FIG. 3 and FIG. 4 are a fragmentary view of an apparatus for variably controlling a running speed of each hydraulic motors in accordance with another embodiment of the present invention, particularly illustrating a mechanism for detecting a running load of each hydraulic motor, respectively.

A controller 27 is composed of a memory 43, a calculating unit 44 and a CPU 45. As shown in FIG. 2, the CPU 45 is composed of a high speed/low speed basic setting portion 28, a run control state determining portion 29 for determining the present control state relative to the running movement of a vehicle, a loading state determining portion 30 for determining the present loading state of each hydraulic motor loaded with a pressurized oil during the running movement of the vehicle, an engine rotation state determining portion 37 and a high speed/low speed shift correcting portion 38.

A shift switch 31 for shifting a rotational speed of each of the hydraulic motors 10 and 10' to a high speed (low torque) or a low speed (high torque) by way of two steps is electrically connected to the input side of the high speed/low speed basic setting portion 28. In addition, potentiometers 46' and 47' attached to left-hand and right-hand actuating levers 46 and 47 to detect a quantity of stroke of each lever (quantity of actuation of each lever) are electrically connected to the running control state determining portion 29.

Additionally, a hydraulic pressure sensor 40 is electrically connected to the loading state determining portion 30, and an engine rotational speed detecting sensor 54 is electrically connected to the input side of the engine rotation state determining portion 37.

The output side of each of the high speed/low speed basic setting portion 28, the running control state determining portion 29, the loading state determining portion 30 and the engine rotation state determining portion 37 is electrically connected to the input side of the high speed/low speed shift correcting portion 38. The output side of the high speed/low speed shift correcting portion 38 is electrically connected to solenoids 48 and 49 of the rotation direction changing valve 3 via lead wires 50 and 51, while it is electrically connected to solenoids 48' and 49' of the rotation direction changing valve 3' via lead wires 50' and 51' (see FIG. 1). In addition, the output side of the high speed/low speed shift correcting portion 38 is electrically connected to a solenoid 52 of the speed changing solenoid valve 23 via a lead wire 53.

Next, a mode of operation of the apparatus constructed in the aforementioned manner will be described below.

As a pressurized oil is discharged from the hydraulic pump 2 rotationally driven by the engine 1, it is delivered to the left-hand and right-hand hydraulic motors 10 and 10' via the left-hand and right-hand rotation direction changing valves 3 and 3' and the pipings (13, 14) and (13', 14'), whereby the left-hand and right-hand hydraulic motors 10 and 10' are rotationally driven.

The pressurized oil which has passed through the pipings (13, 14) and (13', 14') are delivered to the shift valves 6 and 6' via the shuttle valves 17 and 17', and thereafter, it is selectively introduced into the swash plate angle variable cylinders (7, 8) and (7', and 8') so as to change a driving power of each of the hydraulic motors 10 and 10' by way of two steps (low speed, high torque and high speed, low torque).

A shifting operation of the shift valves 6 and 6' is controlled by the speed shift solenoid valve 23 which in turn is controlled by the controller 27.

A signal representing the present engine rotational speed detected by the engine rotational speed detecting sensor 54 is inputted into the engine rotation state determining portion 37 of the CPU 45 in the controller 27. The present hydraulic pressure (loading pressure) for driving the vehicle is detected by the hydraulic pressure sensor 40 and a signal representing the detected hydraulic pressure is inputted into the loading state determining portion 30 of the CPU 45 in the controller 27. According to the embodiment of the present invention as mentioned above, the running load of each hydraulic motor is detected by detecting the present hydraulic pressure. Alternatively, it may be detected by detecting the present tilting angle of a swash plate in the hydraulic pump 2. In addition, the engine rotational speed may be detected by detecting an output of an engine rotation setting signal (fuel dial) without any use of an engine rotational speed detecting sensor. Usually, a swash plate angle sensor is disposed in position so as to detect the present tilt angle of a swash plate to properly control the tilt angle of the swash plate in the hydraulic pump 2. In addition, to variably control the swash plate in the hydraulic pump 2, a control signal is transmitted from the controller 27 to an actuator for actuating the swash plate.

Figure 3:
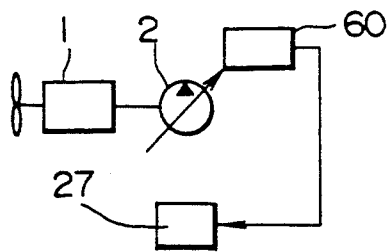
Figure 4:
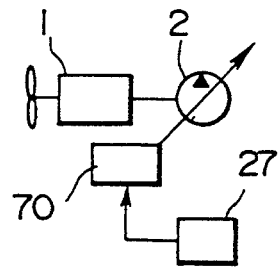

According to another embodiment of the present invention as shown in FIG. 3 and FIG. 4, a detection signal detected by a swash plate angle sensor 60 to be transmitted to the controller 27 or a control signal to be transmitted from the controller 27 to an actuator for varying the tilt angle of the swash plate is used so as to detect the present loading state of each hydraulic motor. Alternatively, detection of the engine rotational speed may be accomplished by using an engine rotation setting signal arbitrarily set by a driver, i.e., a signal representing a working stroke of a fuel lever or a signal outputted from a fuel dial without any direct use of engine rotation to be detected by the engine rotational speed detecting sensor as a signal.

A quantity of actuation stroke of the left-hand and right-hand actuating levers 46 and 47 is detected by the potentiometers 46' and 47', and signals representing the detected actuation quantity, i.e., signals representing displacement of the rotation direction changing valves 3 and 3' are inputted into the running control state determining portion 29 of the CPU 45 in the controller 27.

On the other hand, while a rotational speed of each of the hydraulic motors 10 and 10' are preset by actuating the high speed/low changing switch 31 with an operator hand, a rotational speed setting signal representing the high or low rotational speed of each hydraulic motor is inputted into the high speed/low speed basic setting portion 28, and thereafter, the content of rotational speed setting signal is memorized in the memory 43 of the controller 27.

Subsequently, the engine rotation state determining portion 37 makes binary determination on the present engine rotation state based on the detected present engine rotational speed. In addition, the loading state determining portion 30 makes binary determination on the running load of each hydraulic motor based on the detected present hydraulic pressure for running a vehicle. Additionally, the running control state determining portion 45 makes binary determination on the present running control state based on the detected quantity of actuation of each lever. The high speed/low speed shift correcting portion 38 corrects the set rotational speeds (high speed, two low speeds) based on the results derived from the aforementioned binary determinations and the set rotational speeds stored in the high speed/low speed basic setting portion 28, and thereafter, a sift control signal derived from the corrected rotational speeds (high speed, two low speeds) is outputted to the solenoid 52 of the speed changing solenoid valve 23.

Figure 5:
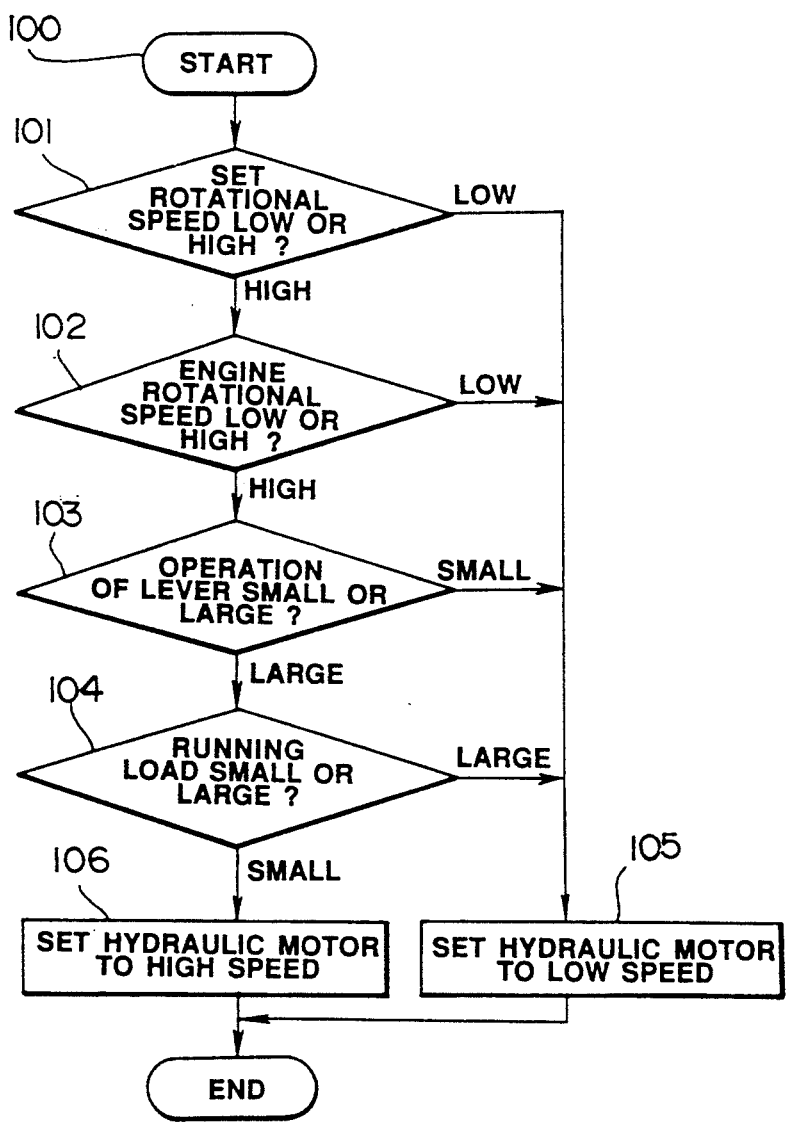
FIG. 5 is a flowchart which illustrates a procedure of steps to be performed by a central processing unit shown in FIG. 1.

Next, a procedure of steps to be executed by the CPU 45 will be described below with reference to FIG. 5.

First, the CPU 45 determines whether the content of the set rotational speed represents a high speed or a low speed (step 101). In a case where it is determined based on the result derived from the determination at the step 101 that the preset rotational speed is a low speed, a shift control signal is outputted to the solenoid 52 of the speed changing solenoid valve 23 to reduce the rotational speed of each of the hydraulic motors 10 and 10' (step 105).

On the other hand, in a case where it is determined based on the result derived from the determination at the step 101 that the preset rotational speed is a high speed, the CPU 45 determines whether the present engine rotational speed exceeds a preset rotational speed or not (step 102). In a case where it is determined from the result derived from the determination at the step 102 that the present engine rotational speed is lower than the preset rotational speed, i.e., it is a low rotational speed, there is no need of running a vehicle at a high speed. Thus, a shift control signal is outputted to the solenoid 52 of the speed changing solenoid valve 23 to reduce the rotational speed of each of the hydraulic motors 10 and 10' (step 105).

On the other hand, in a case where it is determined based on the result derived from the determination at the step 102 that the present engine rotational speed exceeds the preset rotational speed, i.e., it is a high rotational speed, the CPU 45 determines that a quantity of actuation of each lever exceeds a preset quantity of actuation of the same or not (step 103). In a case where it is determined based on the result derived from the determination at the step 103 that the quantity of actuation of each lever is less than the preset quantity of actuation of the same, there is a need of reducing the rotational speed of each of the hydraulic motors 10 and 10' to assume a low speed, e.g., at the time of start of very slow running of a vehicle. Thus, a shift control signal is outputted to the solenoid 52 of the speed changing solenoid valve 23 to reduce the rotational speed of each of the hydraulic motors 10 and 10' (step 105).

On the other hand, in a case where it is determined bases on the result derived from the determination at the step 103 that the present quantity of actuation of each lever exceeds the preset quantity of actuation of the same, the CPU 45 determines whether the hydraulic pressure exerted on each hydraulic motor to rotationally drive the same for running a vehicle exceeds a preset pressure or not (step 104). In a case where it is determined based on the result derived from the determination at the step 104 that the present hydraulic pressure exerted on each hydraulic motor to rotationally drive the same exceeds the preset hydraulic pressure, there is a need of reducing the rotational speed of each of the hydraulic motors 10 and 10' thereby to generate a high torque. For this reason, the CPU 45 outputs a shift control signal to the solenoid 52 of the speed changing solenoid valve 23 so as to reduce the rotational speed of each of the hydraulic motors 10 and 10' (step 105). On the other hand, in a case where it is determined based on the result derived from the determination at the step 104 that the hydraulic pressure exerted on each hydraulic motor to rotationally drive the same for running a vehicle is less than the present hydraulic pressure, this represents a case where the rotational speed of each of the hydraulic motors 10 and 10' may be increased for running a vehicle. For this reason, the CPU 45 outputs a shift control signal to the solenoid 52 of the speed changing solenoid valve 23 so as to allow the hydraulic motors 10 and 10' to be rotationally driven at a high speed (step 106).

INDUSTRIAL APPLICABILITY

As is apparent from the above description, the apparatus of the present invention constructed in the above-described manner assures that proper speed changing is always accomplished under any running condition. Consequently, the apparatus of the present invention is advantageously employable for a vehicle such as a construction machine or the like so as to allow the vehicle to run smoothly.

I claim:

1. An apparatus for variably controlling a running speed of a variable displacement hydraulic motor wherein pressurized oil discharged from a hydraulic pump rotationally driven by an engine is supplied to said hydraulic motor via a rotation direction changing valve to be actuated by an actuating lever for running a vehicle; a swash plate angle of said hydraulic motor being controlled so as to change the rotational speed of said hydraulic motor to assume either a high speed or a low speed, said apparatus comprising:

high speed/low speed setting means for setting said rotational speed of said hydraulic motor to either a high or a low speed, a plurality of swash plate angle variable actuators arranged separately for a high speed and a low speed to be assumed by said hydraulic motor to vary the swash plate angle of said hydraulic motor, a shift valve for selectively supplying pressurized oil output from said rotation direction changing valve to one of said swash plate angle variable actuators, engine rotation state determining means for determining whether rotational speed of said engine exceeds a preset rotational speed, loading state determining means for determining whether running load of said hydraulic motor exceeds a preset value, and a processor for correcting the setting of said high speed/low speed setting means to said low speed when said high speed/low speed setting means is set to said high speed and when either said engine rotation state determining means determines that the rotational speed of said engine does not exceed said preset rotational speed regardless of the determination of said loading state determining means, or said engine rotation state determining means determines that the rotational speed of said engine exceeds said preset rotational speed and said loading state determining means determines that the running load of said hydraulic motor exceeds said preset value, whereby said shift valve is actuated so that said processor means corrects the rotational speed of said hydraulic motor.

2. An apparatus for variably controlling a running speed of a variable displacement hydraulic motor wherein pressurized oil discharged from a hydraulic pump rotationally driven by an engine is supplied to said hydraulic motor via a rotation direction changing valve which is actuated by an actuating lever for running a vehicle; a swash plate angle of said hydraulic motor being controlled so as to change the rotational speed of said hydraulic motor to assume either of a high speed and a low speed, said apparatus comprising:

high speed/low speed setting means for variably setting said rotational speed of said hydraulic motor to a high speed or a low speed, swash plate angle variable actuators arranged separately for a high speed and a low speed to be assumed by said hydraulic motor to vary the swash plate angle of said hydraulic motor, a shift valve for selectively supplying pressurized oil output from said rotation direction changing valve to one of said swash plate angle variable actuators arranged separately for a high speed and a low speed, engine rotation state determining means for determining whether rotational speed of said engine exceeds a preset rotational speed, loading state determining means for determining whether running load of said hydraulic motor exceeds a preset value, running control state determining means for determining whether quantity of actuation of said actuation lever exceeds a preset quantity of actuation, and a processor for correcting the setting of said high speed/low speed setting means to said low speed only when said high speed/low speed setting means is set to said high speed, and further 1) when said engine rotation state determining means determines that the rotational speed of said engine does not exceed said preset rotational speed regardless of the determination made by said running control state determining means and said loading state determining means, or 2) when said engine rotation state determining means determines that the rotational speed of said engine exceeds said preset rotational speed and said running control state determining means determines that the quantity of actuation of said actuation lever does not exceed said preset quantity regardless of the determination made by said loading state determining means, or 3) said engine rotation state determining means determines that the rotational speed of said engine exceeds said preset rotational speed, said running control state determining means determining that the quantity of actuation of said actuation lever exceeds said preset quantity and said loading state determining means determines that the running load of each hydraulic motor exceeds said preset value, whereby said shift valve is actuated so as to correct the rotational speed of said hydraulic motor by said processor.

3. An apparatus for variably controlling a running speed of said hydraulic motor as claimed in claim 2, characterized in that said processor performs a correcting operation to assume said low speed in a case where the setting of said high speed/low speed setting means is said low speed or where the setting of said high speed/low speed setting means is said high speed, and the engine rotational speed is determined by said engine rotation state determining means to be lower than said preset rotational speed or where the setting of said high speed/low speed setting means is said high speed, the engine rotational speed is determined by said engine rotation state determining means to be higher than said preset rotational speed, and the quantity of actuation of said actuation lever is determined by said running control state determining means to be less than said preset quantity of actuation or in a case where the setting of said high speed/low speed setting means is said high speed, the engine rotational speed is determined by said engine rotation state determining means to be higher than said preset rotational speed, and the running load is determined by said load state determining means to be more than said preset value and that said processor performs a correcting operation to assume said high speed in a case where the setting of said high speed/low speed setting means is said high speed, the engine rotation speed is determined by said engine rotation state determining means to be higher than said preset rotational speed, the quantity of actuation of said actuation lever is determined by said running control state determining means to be more than said preset quantity of actuation, and the running load is determined by said loading state determining means to be smaller than said preset value.

* * * * *